United States Patent [19]

Kimura

[11] Patent Number: 4,706,078

[45] Date of Patent: Nov. 10, 1987

[54] APPARATUS FOR DISPLAYING THE LAYOUT OF TEXT

[75] Inventor: Shinichi Kimura, Tokyo, Japan

[73] Assignee: Canon Kabushiki Kaisha, Tokyo, Japan

[21] Appl. No.: 640,741

[22] Filed: Aug. 14, 1984

[30] Foreign Application Priority Data

Aug. 18, 1983 [JP] Japan ................................. 58-149675

[51] Int. Cl.⁴ .............................................. G09G 1/16
[52] U.S. Cl. .................................... 340/735; 340/721; 340/790
[58] Field of Search ............... 340/721, 723, 724, 730, 340/731, 735, 790, 792, 799

[56] References Cited

U.S. PATENT DOCUMENTS

| | | | |
|---|---|---|---|
| 4,181,973 | 1/1980 | Tseng | 340/731 X |
| 4,375,079 | 2/1983 | Ricketts et al. | 340/790 |
| 4,400,697 | 8/1983 | Currie et al. | 340/790 |
| 4,418,345 | 11/1983 | Demke et al. | 340/721 X |
| 4,429,306 | 1/1984 | Macauley et al. | 340/790 |
| 4,455,554 | 6/1984 | Demke | 340/721 X |
| 4,486,745 | 12/1984 | Konno | 340/735 X |
| 4,486,857 | 12/1984 | Heckel | 340/723 X |

*Primary Examiner*—Marshall M. Curtis
*Attorney, Agent, or Firm*—Fitzpatrick, Cella, Harper & Scinto

[57] ABSTRACT

There is disclosed an apparatus and process for displaying the layout of text in a text preparing apparatus. In order to save the space on the display during layout display, the characters, symbols etc. are converted into plural display elements in compressed form to enable the operator to identify the species of the printed characters, symbols etc.

14 Claims, 4 Drawing Figures

| CHARACTER IN TEXT | ENGLISH UPPER CASE | ENGLISH LOWER CASE | NUMERAL | SYMBOL | BLANK |
|---|---|---|---|---|---|
| DISPLAY SYMBOL ON LAY-OUT DISPLAY | ■ | ▫ | ▬ | ▣ | ▦ |

| CHARACTER IN TEXT | ENGLISH UPPER CASE | ENGLISH LOWER CASE | NUMERAL | SYMBOL | BLANK |
|---|---|---|---|---|---|
| DISPLAY SYMBOL ON LAY-OUT DISPLAY | ■ | ▫ | ▯ | ▭ | ⊞ |

The Canon Charger
CH-3 and PSC-3 can
also be used to

APPARATUS FOR DISPLAYING THE LAYOUT OF TEXT

BACKGROUND OF THE INVENTION

1. Field of the Invention

The present invention relates to an apparatus and process for displaying the layout of a text prepared in an electronic apparatus that functions to prepare text by editing entered character data, and more particularly to such an apparatus and process for enabling efficient layout operation by clearly indicating the species of the characters etc. in the text.

2. Description of the Prior Art

Electronic apparatus having the above-mentioned text preparing function, are already known to perform a process of displaying the layout of the prepared text by replacing each character with a small display element such as a group of plural dots. Such text layout display function is required in the above-mentioned electronic apparatus for the following reason. Since the display screen provided in such electronic apparatus can generally display only a limited number of characters, it is often not possible to confirm the layout of the prepared text on said display screen prior to the printout onto a recording sheet, if the characters are displayed in their original forms on the screen. Thus the characters, numerals, symbols etc. constituting the text are compressed by being replaced with the aforementioned display elements. The display elements are used for displaying the layout of the entire text in the limited space of the screen thereby enabling confirmation of the arrangement or layout of the characters etc.

However, in such conventional text layout display process, the same display element is used commonly for all the characters, numerals, symbols etc. in the text, so that it merely indicates the presence of a character or the like in the corresponding position but does not identify which character is present in which position. However, text preparation with such electronic apparatus often becomes easier if the positions of certain characters, for example particular symbols or numerals, are known, or if the operator can correlate the text layout on the screen with that of a handwritten draft. In such case the efficiency of text preparation will be significantly improved if the species of the characters, symbols etc. can be identified in the text layout display.

SUMMARY OF THE INVENTION

In consideration of the foregoing, an object of the present invention is to provide an apparatus and process for text layout display to indicate the layout of the entire prepared text on a display screen of limited space while indicating the category or species of characters, for example, alphabetic characters, numerals, marks, symbols and the like in the text prepared in the electronic apparatus, thereby improving the efficiency of text preparation.

Another object of the present invention is to provide an electronic apparatus having a text preparing function comprising means for discriminating the species of characters etc. in the text and means for selecting different display elements according to the species of said characters etc. in the text, thus being capable of text layout display by the arrangement of different display elements corresponding to the species of the characters etc. in the text.

DETAILED DESCRIPTION OF THE PREFERRED EMBODIMENTS

Now the present invention will be explained in detail with reference to an embodiment thereof shown in the attached drawings.

Figure 1:
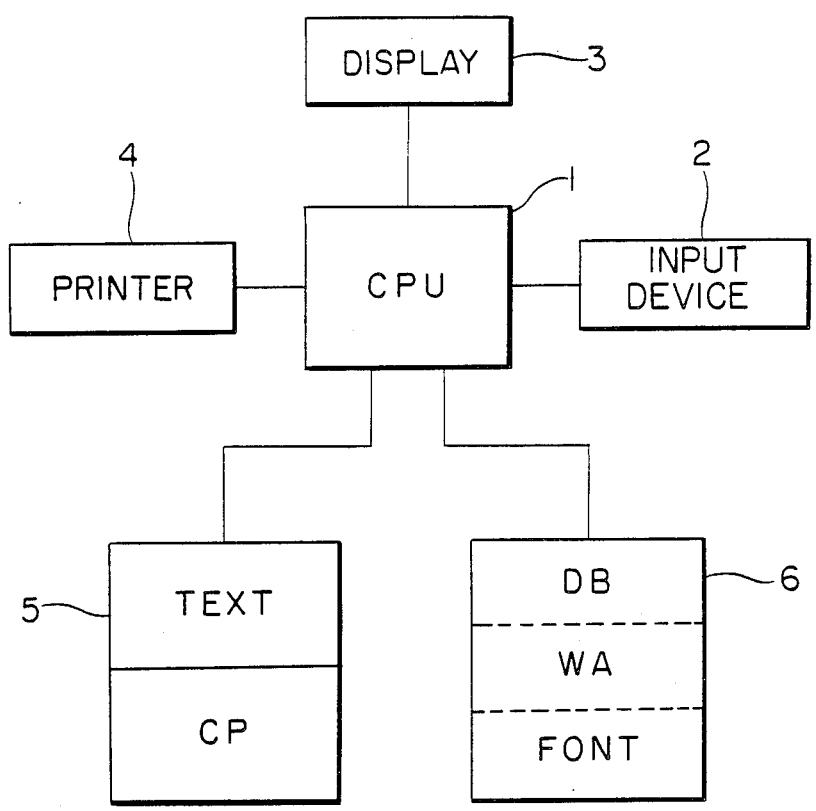
FIG. 1 is a block diagram showing an embodiment of the structure of the text layout display apparatus of the present invention.
Figure 2:
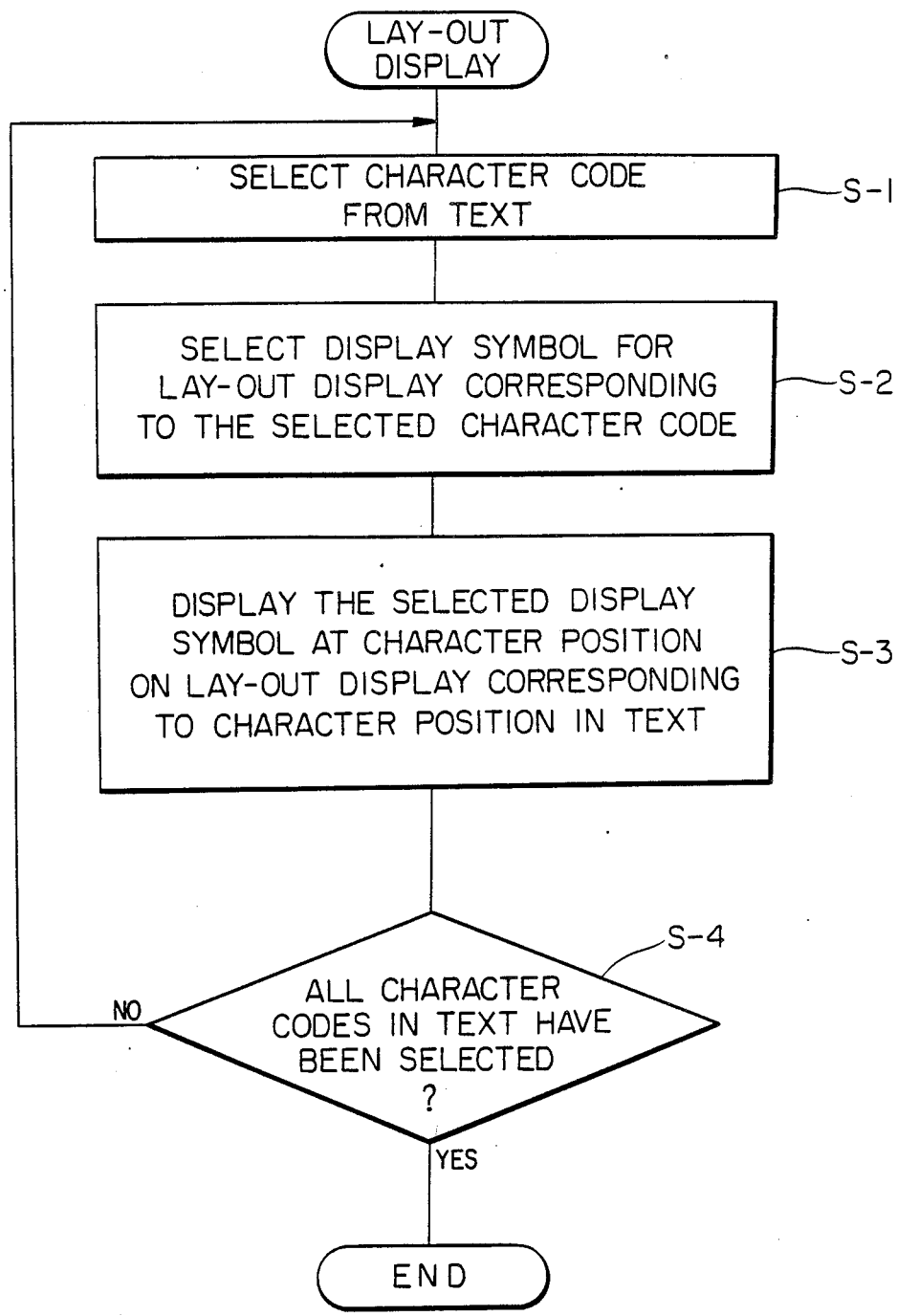
FIG. 2 is a flow chart showing the procedure of text layout display.

FIG. 1 shows an example of the structure of an apparatus adapted for text layout display in accordance with the present invention, wherein depicted are a central processing unit (CPU) 1 for controlling the entire apparatus; an input device 2 comprising a keyboard provided with keys representing characters, numerals, symbols etc., to be used for entering the text to be prepared and entering commands to the apparatus; a display device 3 for example comprising display pixels in $120 \times 15$ dot matrix form for displaying 2 lines of 20 characters each represented by a $5 \times 7$ dot matrix, thus indicating 2 lines of the prepared text or a response to the command of the operator; a printing device 4 for printing the prepared text; a main memory 5 for storing the prepared text (TEXT) and a control program (CP) shown in FIG. 2; and an auxiliary memory 6 for storing auxiliary data such as character font data and patterns representing the species of the characters etc. (FONT) and other various programs. The above-mentioned components 2 to 6 are connected to and controlled by the central processing unit (CPU) 1.

Figures 3, 4:
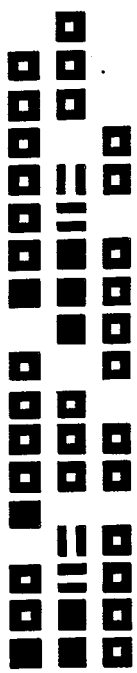
FIG. 3 is a schematic view of example of display elements to be employed in said text layout display.
FIG. 4 is a schematic view showing an example of said text layout display.

FIG. 2 shows a flow chart of the control procedure of for text layout display for the above-described apparatus, while FIG. 3 shows example of display elements corresponding to the characters, numerals, symbols etc. constituting the text, and FIG. 4 shows an example of text layout display of an English text by means of the above-mentioned display elements. Each of the display elements shown in FIG. 3 has a $3 \times 3$ dot matrix structure adapted for use in the preparation of an English text.

Now there will be given an explanation of the function of the above-described embodiment, while making reference to the above-described drawings.

In the course of text preparation, the characters entered by the key operations of the input device 2 are stored in succession in the text memory TEXT, and the corresponding patterns are obtained from the character font FONT of the auxiliary memory 6 and are displayed on the display device 3. The display only shows 20 characters$\times$2 lines in the content of the memory TEXT, so that the displayed portion of the content of the memory TEXT is shifted in succession in response to the entry of characters into the memory TEXT.

Then, in response to the actuation of a key in the input device 2 for instructing text layout display, the codes of the characters etc. in the prepared text are taken out from the main memory 5 in a step S-1. Then a step S-2 discriminates the species of the codes of characters etc. in the central processing unit 1 and the layout display elements corresponding to the species of said codes are taken out as pattern data from the area FONT of the auxiliary memory 6 and stored in a display buffer memory DB. Then, in a step S-3, the display elements stored in said buffer memory DB are displayed on the layout display screen by activating the dot matrix pixels in the manner as shown in FIG. 4. Subsequently in a step S-4 it is discriminated whether the layout display operation is conducted for all the characters, numerals, symbols etc. in the prepared text, and the above-described layout display procedure is repeated until said operation is completed.

As will be apparent from the foregoing description, the present invention provides for the display on a display device of limited space of the layout of text prepared by an electronic apparatus having a text preparing function and indicates the arrangements of the characters etc. in the text by means of different display elements corresponding to the different species of the characters, numerals, symbols etc. constituting the text. Therefore, easy and secure correlation between the prepared text and the original draft is provided so that, the operator may grasp the status of the prepared text from the use of such layout display elements. Text preparation work may accordingly be done in a significantly easier and more efficient manner.

In the foregoing embodiment the memory capacity of the text memory TEXT is selected larger than the display capacity of the display device 3. Thus, in order to complete the layout display of the entire text, there may be employed automatic scrolling or manual scrolling by the unit of a line or a dot line by a key operation.

What I claim is:

1. Electronic text preparing apparatus comprising:
    memory means for storing text containing plural lines of characters, each character having one of at least two different characteristics, at least one of said characteristics being common to at least two different characters;
    discrimination means for detecting a selected characteristic of each character in said plural lines of characters stored in said memory means;
    pattern memory means for storing patterns, each pattern corresponding to one of the respective characteristics of the characters detected by said discrimination means;
    conversion means for converting each character of said plural lines of characters, which are stored in said memory means, into one of said patterns stored in said pattern memory means, according to the characteristic detected by said discrimination means; and
    display means, responsive to said conversion means, for displaying said patterns.

2. Electronic text preparing apparatus according to claim 1, wherein said pattern memory means comprises a read-only memory.

3. Electronic text preparing apparatus according to claim 1, wherein said display means comprises a dot matrix display unit.

4. Electronic text preparing apparatus comprising:
    memory means for storing text including character information for each character of the text, the character information for each character having one of at least two different characteristics, at least one of said characteristics being common to the character information of at least two different characters;
    discrimination means for detecting, for each character, a selected characteristic of the character information for each character constituting the text stored in said memory means;
    pattern memory means for storing patterns, each pattern corresponding to one of the selected characteristics of the character information detected by said discrimination means; and
    layout means for causing said discrimination means to detect the selected characteristic of the character information for each character, which is stored in said memory means, for reading a specific pattern from said pattern memory means according to the characteristic detected by said discrimination means, and for displaying the layout of the text stored in said memory means utilizing the respective specific patterns detected by said discrimination means.

5. Electronic text preparing apparatus according to claim 4, wherein said pattern memory means comprises a read-only memory.

6. Electronic text preparing apparatus according to claim 4, further comprising dot matrix display means.

7. Electronic text preparing apparatus comprising:
    memory means for storing text including character information for each character of the text, the character information for each character having one of at least two different characteristics, at least one of said characteristics being common to the character information of at least two different characters;
    discrimination means for detecting a selected characteristic of the character information of each character constituting the text stored in said memory means;
    first pattern memory means for storing a first plurality of patterns, each pattern corresponding to the character information of a respective one of the characters constituting the text;
    second pattern memory means for storing a second plurality of patterns, each pattern corresponding to one of the respective characteristics of the character information detected by said discrimination means;
    first output means for converting the character information constituting the text stored in said memory means into said respective first patterns stored in said first pattern memory means;
    second output means, responsive to said discrimination means, for converting the character information, stored in said memory means, into said specific second patterns, respectively, stored in said second pattern memory means; and
    display means, responsive to said first and second output means, for selectively displaying the first and second patterns.

8. Electronic text preparing apparatus according to claim 7, wherein said display means comprises dot matrix display means.

9. Electronic text preparing apparatus according to claim 1, wherein said discrimination means detects at least the characteristics of capital letters and lower case letters.

10. Electronic text preparing apparatus according to claim 1, wherein said discrimination means detects at least the characteristics of letters, numerals and symbols.

11. Electronic text preparing apparatus according to claim 4, wherein said discrimination means detects at least the characteristics of capital letters and lower case letters.

12. Electronic text preparing apparatus according to claim 4, wherein said discrimination means detects at least the characteristics of letters, numerals and symbols.

13. Electronic text preparing apparatus according to claim 7, wherein said discrimination means detects at least the characteristics of capital letters and lower case letters.

14. Electronic text preparing apparatus according to claim 7, wherein said discrimination means detects at least the characteristics of letters, numerals and symbols.

* * * * *